Feb. 14, 1967 P. K. DANO 3,304,437

SINGLE-SHOT MULTIVIBRATOR PULSE WIDTH CONTROLLED BY REPETITION RATE

Filed Aug. 20, 1963

INVENTOR.
PAUL K. DANO

BY

ATTORNEYS

United States Patent Office 3,304,437
Patented Feb. 14, 1967

3,304,437
SINGLE-SHOT MULTIVIBRATOR PULSE WIDTH CONTROLLED BY REPETITION RATE

Paul K. Dano, San Diego, Calif., assignor to the United States of America as represented by the Secretary of the Navy Filed Aug. 20, 1963, Ser. No. 303,450
4 Claims. (Cl. 307—88.5)

Figures 1, 2:
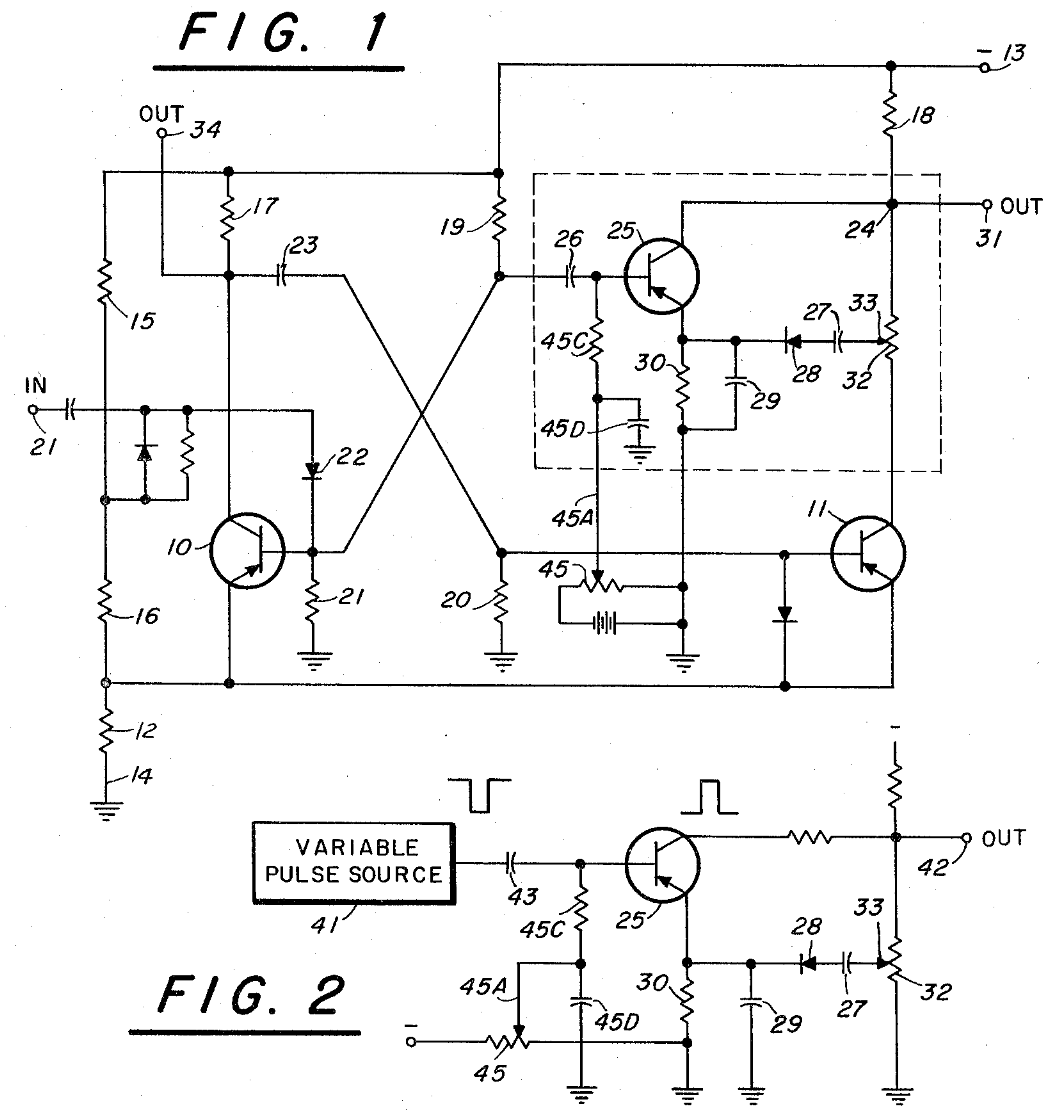

The invention described herein may be manufactured and used by or for the Government of the United States of America for governmental purposes without the payment of any royalties thereon or therefor.

This invention relates to multivibrators and is particularly directed to the monostable type multivibrator with means for correlating the pulse width with the repetition rate of the multivibrator.

It is necessary on occasion to hold constant the duty ratio of a pulse generator. That is, it is sometimes necessary to shorten the pulse as the spaces between pulses shorten. If the product of the pulse duration and repetition rate is not constant in radar systems, for example, the radio frequency power will change as the repetition rate changes. In digital-to-analogue converters, where an analogue voltage proportional to repetition rate is derived by integration, a changeable duty ratio will upset the calibration of the converter.

An object of this invention is to provide an improved device for maintaining constant the duty ratio of a multivibrator.

A more specific object of this invention is to provide means for changing the duration of pulses of a series of pulses as a function of pulse repetition rate.

A still more specific object of this invention is to provide means for making pulse duration inversely proportional to repetition rate.

The objects of this invention are attained in a conventional multivibrator including two amplifiers connected back-to-back in the usual manner with a regenerative feedback circuit from the output of one amplifier to the input of the other amplifier. A condenser in the feedback circuit in combination with associated resistances, determine the time constant of the unstable state of the multivibrator. According to an important and characteristic feature of this invention, a variable resistance, R, is connected in series with the condenser, C, in the feedback circuit. Conveniently, the variable resistance device may comprise one path through a transistor, such as the base-to-collector path. The pulse signal voltage output of the multivibrator is sampled, is rectified and is smoothed. The smoothed pulse voltage is now proportional in length to the repetition rate of the multivibrator. The smoothed voltage is applied, in one embodiment of the invention, to the emitter of a transistor to control the effective resistance of the base-to-collector path in response to or as a function of the repetition rate. Hence, the RC time constant in the regenerative feedback circuit becomes a function of repetition rate. According to a further feature of this invention a manually controlled bias may be superimposed upon the automatic bias control just mentioned. This is effected by connecting a direct current line across the input of the transistor through a cable which may be, if an isolation resistor is used, of any length. Since the cable conducts only direct current, when appropriately bypassed for high frequencies and provided with isolation resistance, it is not subject to variable distributed capacitive changes and the remote control station may be at any distance yet accurately, manually control the duration of the pulse period of the multivibrator.

Figure 3:
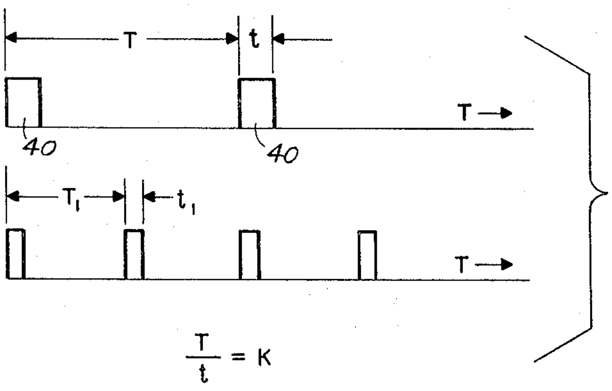

Other objects and features of this invention will become apparent to those skilled in the art by referring to specific embodiments described in the following specification and illustrated in the accompanying drawings in which:

FIG. 1 is a circuit schematic diagram of one multivibrator embodying the duty ratio control features of this invention, FIG. 2 shows in detail, schematically, the circuit of the automatic duty cycle control of FIG. 1, and FIG. 3 shows a family of pulse forms illustrating the constant duty ratio control of the circuit of FIGS. 1 and 2.

The particular multivibrator shown in FIG. 1 comprises two transistor amplifiers 10 and 11. The output of each amplifier is connected to the input of the other amplifier. The two transistors shown are connected in a common emitter follower configuration including emitter resistance 12. While PNP-type transistors are illustrated in FIG. 1, transistors of the P-type may, of course, be employed with appropriate bias polarities. The biasing circuits across the power source connected to terminals 13 and 14 comprise voltage dividing potentiometer resistances 15 and 16 for selecting the bias to the base of transistor 10. Current limiting resistance 17 is connected in series with the collector of transistor 10 and resistance 18 is connected in series with the collector of transistor 11. Resistance 19 is connected between the source and the base of transistor 10 while resistance 20 is connected between the base of transistor 11 and ground. Likewise, resistance 21 is connected between the base of transistor 10 and ground. As shown, transistor 10 in its quiescent state is normally conducting while transistor 11 is normally cut-off.

With the polarities indicated in the illustrated embodiment, a positive voltage received from the input terminal 21 must be applied through diode 22 to the base of transistor 10 to at least momentarily cut-off transistor 10. The momentary differentiated negative-going voltage spike appearing at the collector of transistor 10 is coupled through coupling condenser 23 to the base of transistor 11 which turns transistor 11 on. The momentary positive-going voltage at junction 24 is applied through the base-to-collector circuit of control transistor 25 and the storage condenser 26 to the base of transistor 10. Since this positive voltage fed back from transistor 11 to transistor 10 is in phase with the initially applied positive voltage, the regenerative action of the circuit holds the transistors 10 and 11 in their new states. This new state persists as long as the charge on the condenser 26 remains. The rate at which the charge on condenser 26 dissipates depends upon the resistances connected in series with and across the condenser. The controlling resistance according to this invention is found in the base-to-collector circuit of control transistor 25.

Useful output may be taken from either collector circuit. Output terminal 34 is connected to the collector of transistor 10 while output terminal 31 is connected to the collector of transistor 11. The two voltage values of one output is always complementary to the voltages of the other output.

According to an important feature of this invention the signal voltage at output terminal 31 is generated across load resistor 32 in series with the collector circuit of transistor 11. A controllable amount of output voltage is sampled by the moving contact 33 of the potentiometer and is applied through coupling condenser 27 to rectifier 28. The rectified sampled signal voltage is integrated and smoothed in condenser 29 and is applied across emitter resistor 30. The polarity of the smoothed sampled voltage in FIG. 1 is positive and hence is such that the bias on the emitter of PNP transistor 25 increases as the signal frequency increases. As the emitter bias increases in a positive direction, the effective base-to-collector resistance of transistor 25 decreases and since this resistance is in series with the storage condenser 26, the RC time constant of the series RC circuit is effectively decreased. This means that as the repetition rate of the multivibrator increases, say, under the control of the input trigger voltages at input terminal 21, the sampled signal smoothed voltage increases, the effective R decreases, and the duration of the pulse controlled by condenser 26 decreases. It is now seen that the duration of the output pulse can be made to maintain a relatively fixed ratio with the intervals between pulses. Adjustable direct current bias is applied across the emitter-base electrode to control the pulse duration. The line 45A, of any length, is connected to the potentiometer 45 at the control station. Since only D.C. flows in the line 45A, random capacity effects cannot disturb the calibration of the RC time constant. Isolation resistance 45C and bypass condenser 45D is provided near the base of transistor 25.

An example of the constant duty ratio is shown by the pulse diagram of FIG. 3. If the time interval between pulses is T, the pulse duration might be *t*. If now the pulse repetition rate is increased and the pulse interval is shortened to T1, the pulse duration is correspondingly shortened to *t*1.

The variable RC time constant circuit of the automatic duty ratio control exemplified by the circuit of FIG. 1 have many uses. In FIG. 2, for example, the series condenser-resistance circuit is connected in the output of a variable pulse source 41, the repetition rate of which is controllable. It is desirable to produce at output 42 a series of pulses the duration of which will vary as the pulse reptition rate varies. The coupling and storage condenser 43 connects the output of the pulse source into the variable-resistance transistor 25. The base-to-collector circuit is connected in series between the storage condenser 43 and the output terminal 42. In FIG. 2 the output voltage is generated across resistor 32 which is sampled as above by the potentiometer contact 33, is rectified at 28 and is smoothed in the condenser resistor combination 29 and 30, and applied to the emitter. Manual adjustment of emitter bias may be made by the variable voltage source at the potentiometer 45, which in the example shown applies a variable negative bias on the base with respect to the emitter. The circuit of FIG. 2 would be particularly useful in coupling a pulse source to a digital-to-analogue converter, where the output 42 might be connected into an integrating circuit, for example. The integration of a fixed number of pulses would become independent of the repetition rate of the pulse series inasmuch as the pulse duration, *t*, is always a fixed ratio of the pulse interval, T. Whether the pulse source is a multivibrator of the type shown in FIG. 1 or many types known in the art, the variable time constant of this invention is well adapted for maintaining constant the ratio between the pulse intervals and the pulse duration.

Many modifications may be made in the specific circuits of this invention without departing from the spirit of the invention as defined in the following claims.

What is claimed is:

1. In combination, a one shot multivibrator having two amplifiers with regenerative feedback circuits, respectively, from the output of each amplifier to the input of the other amplifier, the feedback circuit from the output of one amplifier; including in series a condenser and a variable resistance, means for regulating the RC time constant of the one feedback circuit, said variable resistance comprising the base-collector circuit of a transistor, means for sampling the pulse signal voltage in the output of said one amplifier, means for rectifying and smoothing the sampled signal, and means for applying the smoothed voltage to the emitter of said transistor to control the effective resistance of the base-collector circuit and to control the duration of one state of the multivibrator as a function of the pulse repetition rate of the multivibrator.

2. In combination, an amplifier with a regenerative circuit connected from the output to the input of said amplifier, said regenerative circuit including a condenser and a variable resistance device connected in series in said regenerative circuit, said resistance device comprising the base-to-collector path of a transistor, means for sampling the signal voltage at the output of said amplifier, means for rectifying and integrating the sampled signal, and means for applying the integrating signal to the emitter of said transistor to control the base-to-collector resistance as a function of the frequency of said signal.

3. In combination in a monostable multivibrator, an amplifier with a regenerative circuit connected between the output and input circuit of said amplifier, said regenerative circuit including a condenser, a variable resistance device, said condenser and resistance device being connected in series in said regenerative circuit so as to control the duration of the unstable state of said amplifier, means for adjusting the resistance of said device comprising means for rectifying and integrating the signals of the output of said amplifier and means for applying said rectified integrated voltage to said resistance device to vary the resistance of said device as an inverse function of the trigger frequency to maintain constant the pulse duration and the interval between pulses.

4. In combination, a one shot multivibrator having an amplifier with a regenerative feedback circuit between the output and the input of the amplifier, said feedback circuit including in series a condenser of capacity C and a variable resistor means of resistance R for regulating the RC time constant of the feedback circuit, said resistor means comprising the base-collector circuit of a control transistor, a variable frequency trigger pulse source coupled to said multivibrator to trigger said multivibrator, means for sampling the pulse signal voltage in the output of said amplifier, means for rectifying and smoothing the sampled signal, means for applying the smoothed voltage to the emitter of said transistor to control the effective resistance R of the base-collector circuit and to control the duration of said unstable state of the multivibrator as a function of the pulse repetition rate of the multivibrator.

References Cited by the Examiner

UNITED STATES PATENTS

| | | | |
|---|---|---|---|
| 3,058,113 | 10/1962 | Wilson | 307—88.5 |
| 3,100,876 | 8/1963 | Schulz | 330—26 |
| 3,184,604 | 5/1965 | Hale | 307—88.5 |
| 3,204,124 | 8/1965 | Durio | 307—88.5 |
| 3,211,926 | 10/1965 | Frysinger | 307—88.5 |
| 3,227,891 | 1/1966 | Ashcraft | 307—88.5 |

JOHN W. HUCKERT, *Primary Examiner.*

J. D. CRAIG, *Assistant Examiner.*